United States Patent
Liu et al.

(10) Patent No.: US 12,132,351 B2
(45) Date of Patent: Oct. 29, 2024

(54) STATOR PUNCHING PIECE, MOTOR, COMPRESSOR AND HOUSEHOLD APPLIANCE

(71) Applicant: ANHUI MEIZHI PRECISION MANUFACTURING CO., LTD., Anhui (CN)

(72) Inventors: Famin Liu, Anhui (CN); Lan Yu, Anhui (CN); Xiaohua Qiu, Anhui (CN); Hui Chen, Anhui (CN)

(73) Assignee: ANHUI MEIZHI PRECISION MANUFACTURING CO., LTD., Anhui (CN)

( * ) Notice: Subject to any disclaimer, the term of this patent is extended or adjusted under 35 U.S.C. 154(b) by 249 days.

(21) Appl. No.: 17/745,133

(22) Filed: May 16, 2022

(65) Prior Publication Data

US 2022/0344984 A1 Oct. 27, 2022

Related U.S. Application Data

(63) Continuation of application No. PCT/CN2021/120602, filed on Sep. 26, 2021.

(30) Foreign Application Priority Data

Apr. 16, 2021 (CN) .......................... 202110417468.0

(51) Int. Cl.
*H02K 1/16* (2006.01)
(52) U.S. Cl.
CPC ........... *H02K 1/16* (2013.01); *H02K 2213/03* (2013.01)

(58) Field of Classification Search
CPC ...... H02K 1/16; H02K 2213/03; H02K 29/03; H02K 1/146; H02K 2201/03
See application file for complete search history.

(56) References Cited

U.S. PATENT DOCUMENTS

| 6,628,034 B2 * | 9/2003 | Jang ........................ H02K 21/16 310/179 |
| 2016/0344244 A1 | 11/2016 | Li et al. |

(Continued)

FOREIGN PATENT DOCUMENTS

| CN | 208272719 U | 12/2018 |
| CN | 112467897 A | 3/2021 |

(Continued)

OTHER PUBLICATIONS

Supplementary European Search Report dated Jan. 11, 2023 received in European Patent Application No. EP 21899283.2.

(Continued)

*Primary Examiner* — Thomas Truong
(74) *Attorney, Agent, or Firm* — Scully, Scott, Murphy & Presser, P.C.

(57) ABSTRACT

A stator punching piece, a motor, a compressor and a household appliance are provided. The stator punching piece has a rotor hole, a yoke and multiple stator teeth. The yoke is provided on an outer circumference of the stator punching piece. The teeth are provided at intervals along an inner circumference of the yoke. Each stator tooth has a tooth body and a tooth shoe. One end of the tooth body is connected with the yoke and the other end of the tooth body is connected with the tooth shoe. A side of the tooth shoe facing the rotor hole is provided with an adjusting groove, and a centerline of the tooth body divides the stator teeth into a first area and a second area.

19 Claims, 7 Drawing Sheets

(56) References Cited

U.S. PATENT DOCUMENTS

2017/0063179 A1\* 3/2017 Li .......................... H02K 7/145
2018/0316230 A1\* 11/2018 Benjack ................... H02K 5/24

FOREIGN PATENT DOCUMENTS

| CN | 112583143 | A |   | 3/2021  |
|----|-----------|---|---|---------|
| CN | 113162261 | A |   | 7/2021  |
| CN | 214958929 | U |   | 11/2021 |
| CN | 113765252 | A |   | 12/2021 |
| JP | 2003102138 | A |   | 4/2003  |
| JP | 2012029515 | A |   | 2/2012  |
| JP | 2013121271 | A | \* | 6/2013 |
| JP | 2019208360 | A |   | 12/2019 |
| WO | 2020207861 | A1 |  | 10/2020 |

OTHER PUBLICATIONS

Notice of Reasons for Refusal dated Jun. 20, 2023 received in Japanese Patent Application No. JP 2022-542076.
International Search Report and Written Opinion dated Jan. 18, 2022 received in International Application No. PCT/CN2021/120602 together with an English language translation.

\* cited by examiner

STATOR PUNCHING PIECE, MOTOR, COMPRESSOR AND HOUSEHOLD APPLIANCE

CROSS REFERENCE TO RELATED APPLICATIONS

The present application is a continuation application of PCT International Application No. PCT/CN2021/120602, filed on Sep. 26, 2021, which claims priority to and benefits of Chinese Patent Application No. 202110417468.0 filed on Apr. 16, 2021, the entire contents of which are incorporated herein by reference for all purposes. No new matter has been introduced.

FIELD

The present application relates to the field of electric motors, and in particular, to a stator punching piece, a motor, a compressor and a household appliance applying the stator punching piece.

BACKGROUND

Based on the operation characteristics of bidirectional rotating motor, the stator teeth of the existing motor are symmetrical, and a length of an air gap between the tooth shoe of the stator tooth and the rotor is also symmetrical. The purposes of adopting this symmetrical structure are two: one is to meet bidirectional rotating requirement of the motor; the another is to avoid introducing excessive magnetic field harmonics. However, for an unidirectional rotating motor, this symmetrical structure limits its structural design, and cannot greatly weaken the radial force density of the motor.

SUMMARY

The present application, according to an aspect thereof, provides a stator punching piece and a motor, compressor and household appliance with the stator punching piece, which aims to at least solve the problem that the related art cannot effectively weaken the radial force density of a unidirectional rotating motor.

In order to at least achieve the above purpose, the present application provides a stator punching piece with a rotor hole, comprising:

a plurality of stator teeth provided at intervals along an inner circumference of the yoke; each stator tooth comprising a tooth body and a tooth shoe; one end of the tooth body being connected with the yoke, and another end of the tooth body being connected with the tooth shoe; one side of the tooth shoe facing the rotor hole being provided with an adjusting groove; a centerline of the tooth body dividing the stator teeth into a first area and a second area; the first area being located at an upstream side of a rotation direction of a rotor, and the second area being located at a downstream side of the rotation direction of the rotor; wherein an area of the adjusting groove in the first area is S1, an area the adjusting groove in the second area is S2, and S1 is less than S2.

Optionally, S1 is less than a half of S2.

Optionally, a line from one side of each stator tooth to another side of the stator tooth forms a line segment with a shortest distance, the line segment with the shortest distance from a center of the rotor hole is a first line segment, and an area difference between an area formed between the first line segment and an outer circumference of the rotor hole and an area of the adjusting groove is S3, and (S1+S2)/(S1+S2+S3) is not less than 0.5% and not more than 30%.

Optionally, (S1+S2)/(S1+S2+S3) is not less than 2% and not more than 15%.

Optionally, a bottom of the adjusting groove is concave towards a direction away from the rotor hole to form a first arc, a second arc, a third arc and a fourth arc; the third arc is provided between the first arc and the second arc, and the fourth arc is provided in a middle of the third arc.

Optionally, a circle center of the first arc is located in the second area, a circle center of the second arc is located in the first area, an intersection point of an extension line of the first arc and an extension line of the second arc is located in the second area; a circle center of the third arc is located on the centerline, and a circle center of the fourth arc is located in the second area; two intersection points of the fourth arc and the third arc are located in the second area.

Optionally, a radius of the third arc is R3 and a radius of the fourth arc is R4, R3 is greater than R4 and R4 is greater than 0.

The present application provides a stator punching piece, comprising: a yoke provided on an inner circumference of the stator punching piece; a plurality of stator teeth provided at intervals along an outer circumference of the yoke; each stator tooth comprising a tooth body and a tooth shoe; one end of the tooth body being connected with the yoke, and another end of the tooth body being connected with the tooth shoe; an outer circumference of the tooth shoe being provided with an adjusting groove; a centerline of the tooth body dividing the stator teeth into a first area and a second area; the first area being located at an upstream side of a rotation direction of a rotor, and the second area being located at a downstream side of the rotation direction of the rotor; wherein an area of the adjusting groove in the first area is S1 and an area of the adjusting groove in the second area is S2, and S1 is less than S2.

The present application provides a motor, comprising the stator punching piece mentioned above.

The present application provides a compressor, comprising the motor mentioned above.

The present application provides a household appliance, comprising the compressor mentioned above.

Thus, the present application proposes a stator punching piece, and a motor, compressor and household appliance with the stator punching piece. Specifically, the stator punching piece includes stator teeth, a crown of the stator tooth is provided with an adjusting groove, and an area of the adjusting groove in the first area is less than that in the second area. Thus, the radial force density of the unidirectional rotating motor is effectively weakened.

BRIEF DESCRIPTION OF THE DRAWINGS

In order to more clearly explain the embodiments of the present application or the technical solutions in the related art, the following will briefly introduce the drawings in the embodiments or the description of the related art. It is obvious that the drawings in the following description are only some embodiments of the present application. For those skilled in the art, other drawings can be obtained according to the structure shown in these drawings without paying creative labor.

Figure 1:
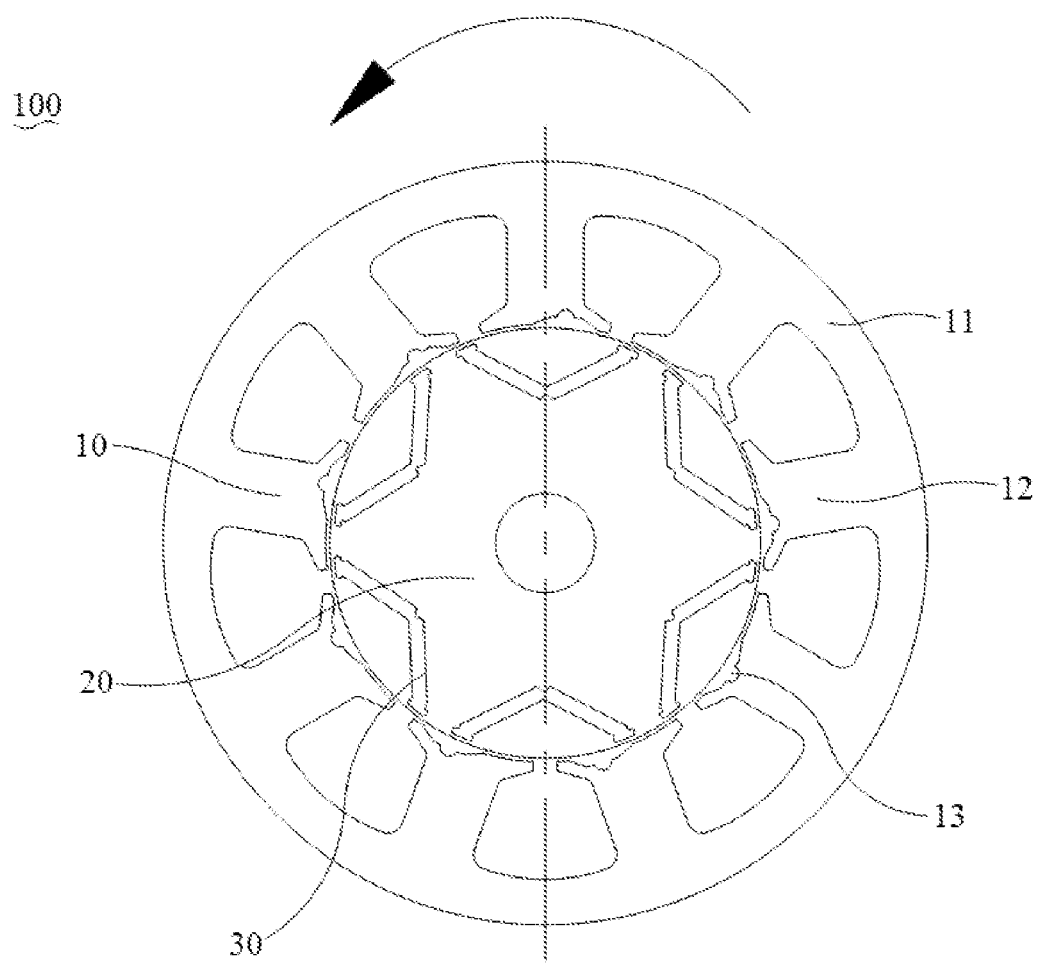
FIG. 1 is a structural diagram of an embodiment of a motor of the present application.

Description of reference numerals shown in the figures is provided in the following table.

| Reference numeral | Name | Reference numeral | Name |
| --- | --- | --- | --- |
| 100 | motor | 11 | yoke |
| 12 | stator tooth | 121 | tooth body |
| 122 | tooth shoe | 13 | adjusting groove |
| 20 | rotor core | 30 | permanent magnet |

The realization of the purpose, functional features and advantages of the present application will be further described with reference to the attached drawings in combination with the embodiments.

DETAILED DESCRIPTION OF EMBODIMENTS

The technical solution in the embodiment of the present application will be clearly and completely described below in combination with the attached drawings in the embodiment of the present application. Obviously, the described embodiments are only part of the embodiments of the present application, not all of the embodiments. Based on the embodiments in the present application, all other embodiments obtained by those skilled in the art without creative work belong to the claimed scope of the present application.

It should be noted that if the embodiment of the present application involves a directional indication (such as up, down, left, right, front, back . . . ), the directional indication is only used to explain the relative position relationship and movement among components in a specific attitude (as shown in the attached drawings). If the specific attitude changes, the directional indication will change accordingly.

In addition, if there is a description of "first", "second" and so on in the embodiment of the present application, the description of "first", "second" and so on is only for the purpose of description, and cannot be understood as indicating or implying its relative importance or implicitly indicating the number of indicated technical features. Thus, the features defined with "first" and "second" may explicitly or implicitly include at least one of the features. In addition, if there exists "and/or" in the full text, it means that it includes three parallel schemes, taking "A and/or B" as an example, "A and/or B" includes scheme A, or scheme B, or both scheme A and B. In addition, the technical solutions between various embodiments can be combined with each other, but it must be based on the realization of those skilled in the art. When a combination of technical solutions is contradictory or impossible, it shall be considered that the combination of technical solutions does not exist and is not within the protection scope of the present application.

Most of the existing stator punching pieces are designed based on the bidirectional rotating motor. However, the stator teeth of the bidirectional rotating motor are generally symmetrical, and a length of an air gap between the tooth shoe of the stator tooth and the rotor is also symmetrical. The purposes of adopting the stator tooth of symmetrical structure in the existing technology are two: (1) one is to meet the bidirectional rotating requirement of the motor; (2) the another is to avoid introducing excessive magnetic field harmonics. However, there exists currently an unidirectional rotating motor, for example, the compressor actually adopts an unidirectional rotating motor. The existing design concept of symmetrical stator teeth may not be suitable for unidirectional rotating motors. Moreover, it cannot effectively weaken the radial force density of the motor.

Figure 2:
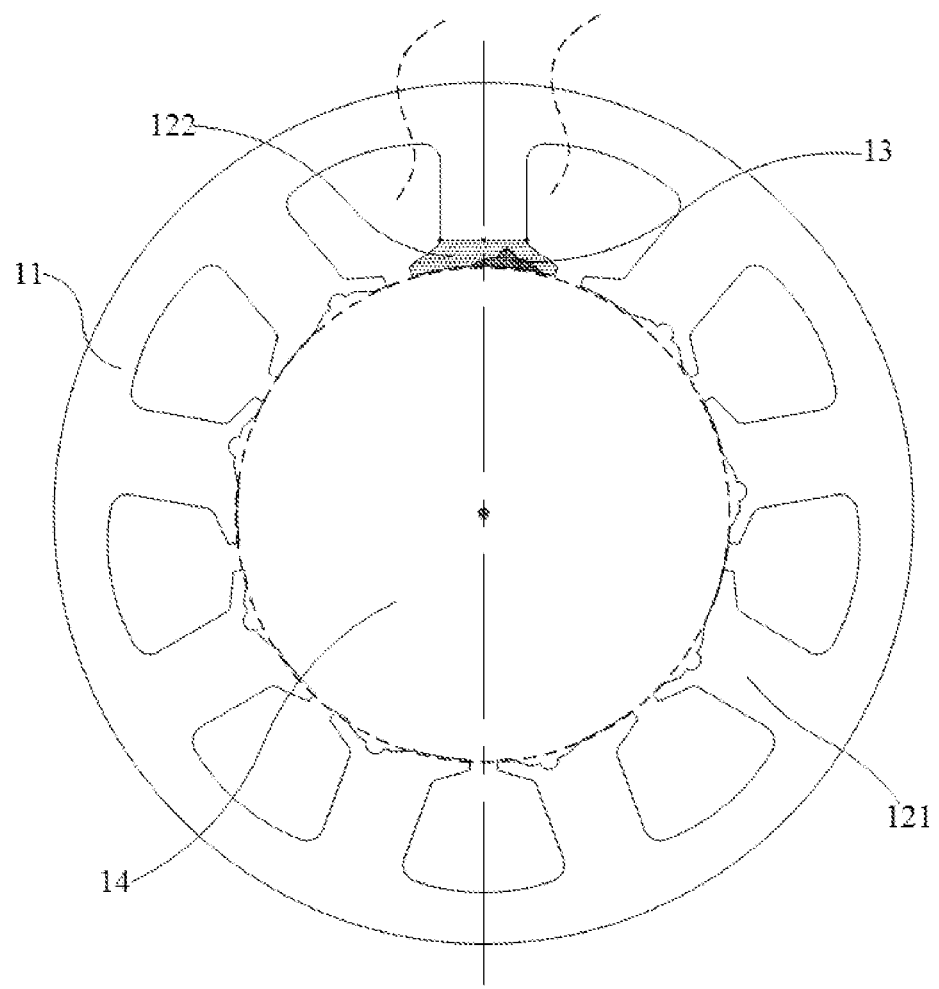
FIG. 2 is the structural diagram of a stator punching piece in FIG. 1.
Figure 3:
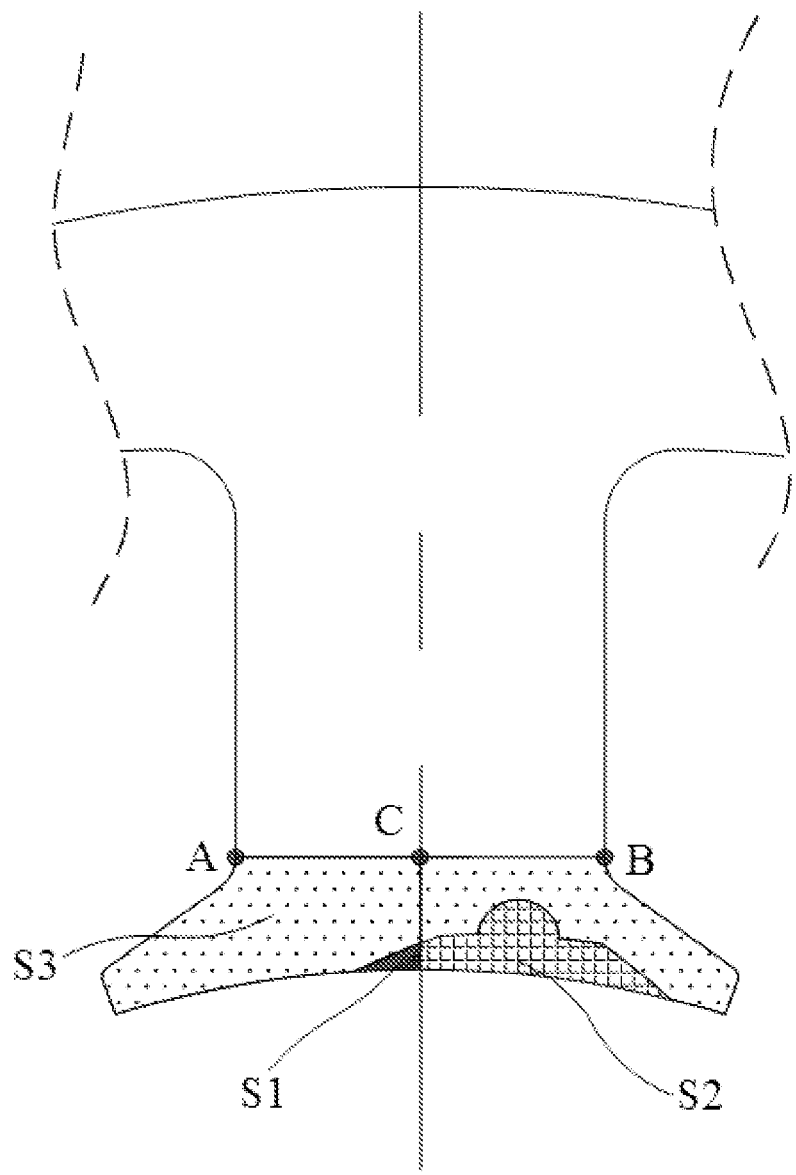
FIG. 3 is the structural diagram of a stator teeth in FIG. 2.

Referring to FIGS. 1-3, the present application proposes a stator punching piece, which includes a yoke 11 and a plurality of stator teeth 12, and the stator punching piece also includes a rotor hole 14. A plurality of stator teeth 12 are provided at intervals along an inner circumference of the yoke 11, and the yoke 11 is provided on an outer circumference of the stator punching piece. In this embodiment, the stator tooth 12 includes a tooth body 121 and a tooth shoe 122, and one end of the tooth body 121 is connected with the yoke 11, and another end of the tooth body 121 is connected with the tooth shoe 122. A side of the tooth shoe 122 facing the rotor hole 14 is provided with an adjusting groove 13. Further, a centerline of the tooth body 121 divides the stator teeth 12 into a first area and a second area. The first area is located at an upstream side of a rotation direction of a rotor, and the second area is located at a downstream side of the rotation direction of the rotor. An area of the adjusting groove 13 in the first area is S1, and an area of the adjusting groove 13 in the second area is S2, S1 is less than S2.

The present application provides a stator punching piece suitable for unidirectional rotation. The stator punching piece is provided with an adjusting groove 13 on the tooth shoe 122, so that the stator punching piece is of an asymmetric structure. On the one hand, it can effectively weaken the radial force density of the motor 100 when the motor 100 rotates in a specific direction, such that a harmonic rate of a magnetic field in the air gap under the working state of the motor is improved. On the other hand, a torque fluctuation, radial force wave and iron consumption of the motor 100 are reduced to a certain extent, thereby improving noise and increasing efficiency.

Harmonic refers to each component greater than integral times of fundamental frequency obtained by Fourier series decomposition of periodic non sinusoidal alternating flow, which is usually high-order harmonic. During the operation of motor 100, the harmonic content between the stator and the rotor is rich, which is easy to cause resonance, resulting in large noise and affecting the user experience. The air gap is a gap between the stator and the rotor in the motor 100. Since the stator punching piece is provided with grooves and teeth, the air gap is constructed along the tooth shape of the stator teeth 12, and because the magnetic conductivity of iron and air is significantly different. Therefore, when the air gap is a toothed structure, the magnetic conductivity of the part facing the teeth between the rotor and the stator is much stronger than that of the part facing the stator groove. In this embodiment, the stator groove refers to an air groove between two adjacent stator teeth 12. Since an adjusting groove 13 is provided on the stator teeth 12, the tooth shape of the stator teeth 12 is effectively changed, so as to change a shape of the air gap, and improve the harmonic rate of the magnetic field of the air gap under the working state of the motor. The radial force makes the stator produce radial periodic vibration periodically, which leads to electromagnetic noise. At the same time, when the vibration frequency of the harmonic is close to that of the stator itself, it is easy to produce resonance, which further increases the electromagnetic noise.

It is worth noting that due to a small thickness of the stator punching piece, the areas (S1, S2 and S3) mentioned here refer to a projected area of the adjusting groove 13 in a thickness direction of the stator punching piece. The rotation direction here is a direction indicated by an arrow in FIG. 1, that is, a rotation direction of the rotor in the motor 100. The dotted line at an edge of the rotor hole 14 refers to a contour of the rotor hole 14, and a top part of the tooth shoe 122 coincides with the rotor hole 14. The centerline of the tooth body 121 passes through a circle center of the rotor hole 14 and divides the tooth body 121 into two symmetrical halves. In an alternative embodiment, S1 may be equal to 0, that is, the adjusting grooves 13 are not provided in the first area, but only provided in the second area. In another alternative embodiment, each stator tooth 12 may be provided with one or more adjusting grooves 13. When only one adjusting groove 13 is provided on the stator tooth 12, the centerline of the tooth body 121 divides the adjusting groove 13 into a first part located in the first area and a second part located in the second area. An area of the first part is smaller than that of the second part. At the same time, a plurality of adjusting grooves 13 can also be provided on the stator teeth 12. At this time, a sum of areas of the adjusting grooves 13 located in the first area is less than that of the adjusting grooves 13 located in the second area. It should be noted that the adjusting groove 13 is provided to improve the harmonic rate of the magnetic field in the air gap under the working state of the motor 100 when the motor 100 rotates in a specific direction. The stator does not rotate and the rotor needs to rotate, so the air gap is needed. For adjusting the air gap, an opening of the adjusting groove 13 is provided on a side of the tooth shoe 122 facing the rotor hole 14.

Further, the stator punching piece also includes a stator groove. The stator groove refers to an air groove provided between two adjacent stator teeth for placing the motor winding. For example, the tooth shoes 122 of the two adjacent stator teeth 12 are not in contact, and the stator groove formed therebetween has a notch facing the rotor hole, namely the gap between two adjacent tooth shoes 122. If the notch of the stator groove is too small, it may make winding difficult. At the same time, the four corners of the stator groove are of an arc. Such arrangement can not only ensure the mechanical strength of an end of the tooth body 121 connected with the yoke 11, but also improve the utilization rate of the groove area of the stator groove. Further, a bottom of the stator groove is of an arc, and the arc coincides with the inner circumference of the yoke 11. Such an arrangement is conducive to the magnetic force distribution during an operation of the motor 100.

Referring to FIG. 3, in one embodiment, S1 is less than a half of S2. At the same time, S1 and S2 should not be too close to each other. If S1 is more than a half of S2, the air gap still can be adjusted to reduce the radial force density, but a proportion of the area S1 of the adjusting groove 13 in the first area is too high, bringing no significance effect in adjusting. Therefore, a relationship between S1 and S2 is further defined to obtain a better adjusting effect, thereby further reducing the radial force density of stator punching piece.

Referring to FIG. 3, in one embodiment, for a stator tooth 12, a line from one side of the stator tooth 12 to another side thereof forms a shortest line segment. Among these line segments, the line segment with the shortest distance from a circle center of the rotor hole 14 is a first line segment, by which an area relationship between the tooth shoe 122 and the adjusting groove 13 can be conveniently described. An area difference between an area from the first line segment to the outer circumference of the rotor hole 14 and the area of the adjusting groove 13 is S3, that is, the area of the tooth shoe 122 is S3. (S1+S2+S3) is the area from the first line segment to the outer circumference of the rotor hole, (S1+S2) is the area of the adjusting groove. (S1+S2)/(S1+S2+S3) is not less than 0.5% and not more than 30%. In this embodiment, (S1+S2)/(S1+S2+S3) is a ratio of the area of the adjusting groove to the area formed between the first line segment and the outer circumference of the rotor hole, which is mainly used to represent a relative area of the adjusting groove.

Referring to FIG. 3, AB is the first line segment meeting the requirements that a distance from one side of the stator tooth 12 to another side thereof is the shortest distance and a distance from the first line segment to the center of the rotor hole 14 is the shortest distance. At the same time, a connecting line from the circle center of the rotor hole 14 to point C is perpendicular to AB, and the straight line is on a radius of a circle where the rotor hole 14 is located. A distance from the circle center to point C is a distance from the line AB to the circle center of the rotor hole 14. At the same time, the adjusting groove 13 provided at the tooth shoe 122 has better adjusting effect. Although the adjusting groove 13 can extend towards the yoke 11, so as to extend to the tooth body 121 of the stator teeth 12, however, a part of the adjusting groove 13 provided in the tooth body 121 cannot effectively weaken the radial force density. At the same time, it may affect the normal operation of stator punching piece. Therefore, the adjusting groove 13 is generally located in the tooth shoe 122, but it does not exclude the configuration where a part of the adjusting groove 13 extends to the tooth body 121. In one embodiment, when the groove 13 is completely located in the tooth shoe 122, an ratio of the area is (S1+S2)/(S1+S2+S3), namely the ratio of the area of the groove 13 to the area from the line segment AB to an edge of the rotor hole 14. The area from the line segment AB to the edge of the rotor hole 14 is a sum of the area S3 of the tooth shoe 122 and the areas S1, S2 of the adjusting groove 13 in the first area and second area. The values of (S1+S2+S3) of the stator punching pieces of the same model are the same. (S1+S2)/(S1+S2+S3) mainly indicates the relative size of the area of the adjusting groove 13.

Further, after many tests and simulations, it is found that when (S1+S2)/(S1+S2+S3) is not less than 0.5% and not more than 30%, the radial force density of the motor 100 with the stator punching piece can be effectively reduced unexpectedly. If the relative area of the adjusting groove 13 is too small, the adjusting effect of the adjusting groove 13 is insufficient, which cannot effectively reduce the radial force density when the stator punching piece rotates in one direction. If the relative area of adjusting groove 13 is too large, the normal operation of stator punching piece may be affected.

Referring to FIG. 3, in one embodiment, (S1+S2)/(S1+S2+S3) is not less than 2% and not more than 15%. After many experiments, it is found that when (S1+S2)/(S1+S2+S3) is not less than 2% and not more than 15%, adjusting via the adjusting groove 13 can bring a better effect. In a motor 100, after many simulations, it shows that the adjusting effect is better when (S1+S2)/(S1+S2+S3) is between 5% and 6%. At this time, the radial force density of the unidirectional rotating motor 100 with the stator punching piece is reduced to the greatest extent. However, for different models and specifications of motor 100, the optimal proportion of (S1+S2)/(S1+S2+S3) also changes accordingly.

Figure 8:
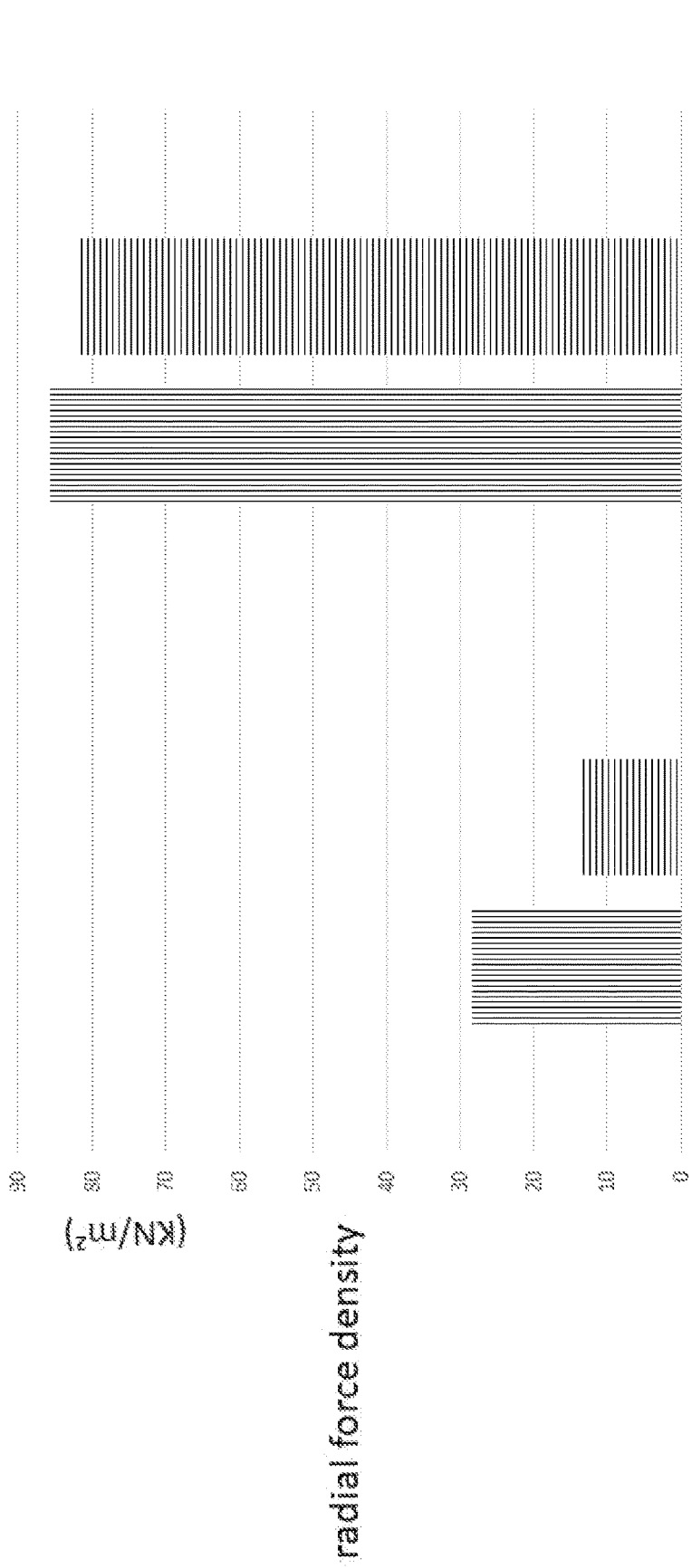
FIG. 8 is a comparison diagram of radial force density between the motor proposed in the present application and the conventional motor.

Referring to FIG. 8, this figure is the comparison histogram of radial force density between the conventional motor and the motor proposed in the present application, which compares the motor of three-stage double frequency with the motor of six-stage double frequency, respectively. Y-axis is the radial force density, of which the unit is kN/m2. Comparing the three-stage double frequency motor with the six-stage double frequency motor by bar chart, it can be seen that the radial force density is significantly reduced in both the motor 100 of third-stage double frequency and the motor 100 of six-stage double frequency. In the third-stage double frequency motor 100, the radial force density of the conventional motor 100 is 28.459 kN/m2, while the radial force density of the motor 100 in the present application is 13.92 kN/m2. In the motor 100 with six-stage double frequency, the radial force density of the conventional motor 100 is 85.62 kN/m2, while the radial force density of the motor 100 in the present application is 82.17 kN/m2.

Figure 4:
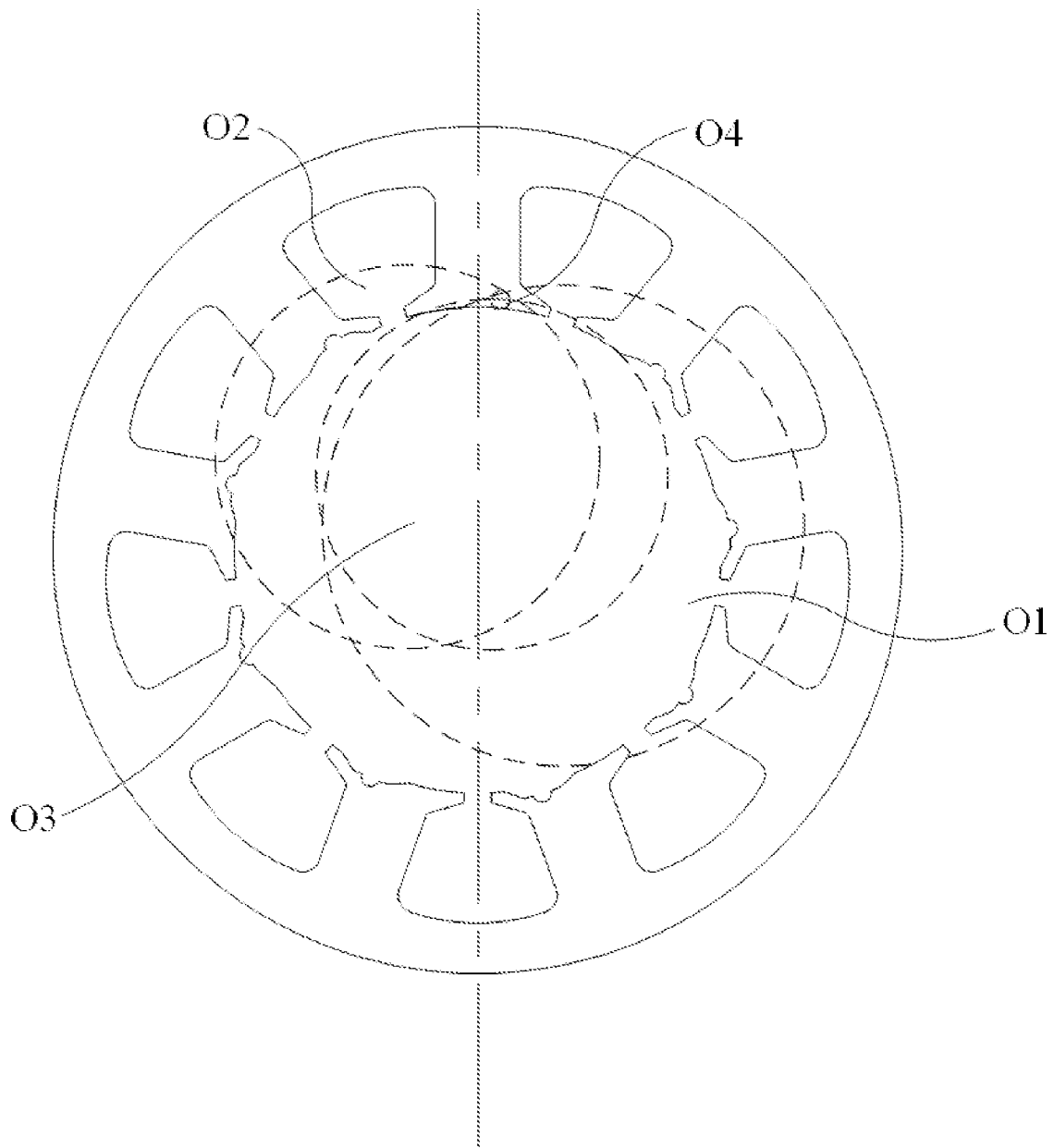
FIG. 4 is a structural diagram of another embodiment of the stator punching piece of the present application.

Referring to FIG. 4, in one embodiment, a bottom of the adjusting groove 13 is concave towards a direction away from the rotor hole 14 to form a first arc, a second arc, a third arc and a fourth arc, and the specific positions of the arcs are as follows: the third arc is located between the first arc and the second arc, and the fourth arc is located in a middle of the third arc.

For the convenience of processing, in an optional embodiment, the adjusting groove 13 is made up of a plurality of arcs. In this way, the specific stator punching piece can be processed by numerical control and presetting the mutual position relationship of a radius and a circle center of each arc. In an optional embodiment, the adjusting groove is provided by cutting, and the parameters of each arc are preset by the numerical control machine to complete the cutting. In addition, the bottom of the adjusting groove 13 refers to a side of the adjusting groove 13 away from the rotor hole 14. In different use scenarios, the adjusting groove 13 of the stator punching piece can also have many other different forms. In one embodiment, the fourth arc may be replaced by a part of a rectangular line or a part of a triangular line. In another embodiment, the bottom of the adjusting groove 13 is composed of regular straight lines. In another embodiment, a bottom curve of the adjusting groove 13 can also be a spline curve. In any event, the method of processing with arc is only an exemplary processing method. The shape of a bottom edge of the adjusting groove 13 is not specifically limited, but it only needs to adjust the relationship between the area S1 of the adjusting groove 13 in the first area and the area S2 of that in the second area to meet the above requirements.

In one embodiment, the adjusting groove 13, such as a straight line, an arc or a spline, can be processed by different cutting paths according to the actual needs. The spline curve refers to a curve obtained by giving a group of control points, and the approximate shape of the curve is controlled by these points. In one embodiment, the stator punching piece is processed by lathe cutting to obtain a suitable shape of the adjusting groove 13. At the same time, the shape of the adjusting groove 13 can also be obtained through a variety of other schemes. It should be noted that the proportional relationship among S1, S2 and S3 is still within the range proposed above, no matter whether the bottom shape of the adjusting groove 13 is linear, arc or spline.

In one embodiment, referring to FIGS. 4, O1, O2, O3 and O4 are circles where the first arc, the second arc, the third arc and the fourth arc are located, respectively. The circle center of the first arc is located in the second area, the circle center of the second arc is located in the first area. An intersection point of the extension line of the first arc and the second arc is located in the second area, the circle center of the third arc is located on the centerline, the circle center of the fourth arc is located in the second area, and the two intersection points of the fourth arc and the third arc are located in the second area.

The relative positional relationships among the arcs can be seen from FIG. 4. By controlling the circle of each arc, such as the radius and the coordinates of the circle center, the ratio of each area of the adjusting groove 13 is controlled. In addition, the fourth arc is obtained by the circle whose center is on the centerline rotating a certain angle in an opposite rotation direction. When the shape and area of the adjusting groove 13 need to be accurately adjusted, the radius and circle center position of the first arc, the second arc and the third arc can be kept unchanged, and different rotation angles and different radius R4 of the fourth arc can be adopted.

In one embodiment, the radius of the third arc and that of the fourth arc are R3 and R4 respectively, R3 is greater than R4 and R4 is greater than 0. The radius of the first arc and that of the second arc are R1 and R2, respectively. In this embodiment, the size and relationship of R1 and R2 are not further limited. Further, the fourth arc is formed by the circle whose center is on the centerline rotating a certain angle in the opposite rotation direction. Such setting is to take a variety of different angle parameters and conduct simulation respectively, so as to obtain the best shape and the area ratio of the adjusting groove 13. In order to make the fourth arc have two intersection points with the third arc and be located in the middle of the third arc, the radius R4 of the fourth arc is less than the radius R3 of the third arc. In an optional embodiment, after setting the first arc, the second arc and the third arc, the proportional relationship of S1, S2 and S3 is still within the above adjusting range. That is, the fourth arc does not need to be set at this time, and R4 can be equal to 0.

Figure 5:
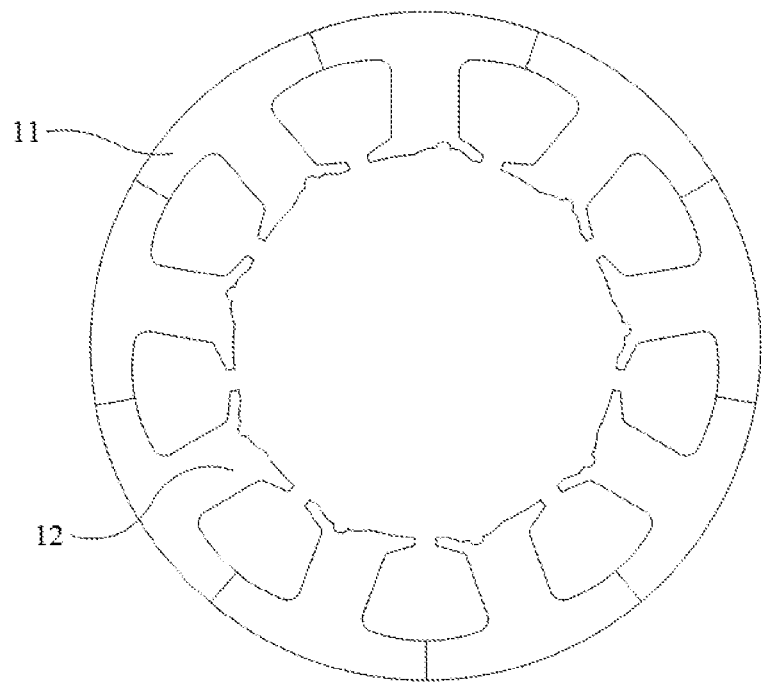
FIG. 5 is a structural diagram of another embodiment of the stator punching piece of the present application.

Referring to FIG. 5, in one embodiment, the stator punching piece is of an integrated structure. In another embodiment, the stator punching piece is of a block structure. The block structure is that the stator punching piece is divided into several small structures, which are processed separately and subsequently then assembled. In one embodiment, each small structure includes a stator tooth 12 and a partial yoke 11, which can be assembled after processing the adjusting groove 13 on each stator tooth 12. These two structures have their own advantages, which can be selected according to the actual needs.

The present application also provides a stator punching piece, which comprises a yoke and a plurality of stator teeth; the yoke is provided on an inner circumference of the stator punching piece; the plurality of stator teeth is provided at intervals along an outer circumference of the yoke; each stator tooth comprises a tooth body and a tooth shoe; one end of the tooth body is connected with the yoke, and another end of the tooth body is connected with the tooth shoe; an outer circumference of the tooth shoe is provided with an adjusting groove; a centerline of the tooth body divides the stator teeth into a first area and a second area; the first area is located at an upstream side of a rotation direction of a rotor, and the second area is located at a downstream side of the rotation direction of the rotor; wherein an area of the adjusting groove in the first area is S1 and an area of the adjusting groove in the second area is S2, S1 is less than S2.

The stator punching piece includes a stator punching piece of an outer rotor and a stator punching piece of an inner rotor. Although most compressors use the stator punching piece of the inner rotor, it is not excluded that there is an unidirectional rotation in outer rotor motor. An adjusting groove is provided on the stator teeth of the stator punching piece of the outer rotor can also reduce the radial force density, optimize the design, improve the efficiency and reduce the noise for the motor with unidirectional rotation. The stator punching piece proposed in the present application includes two cases applied to inner rotor motor and outer rotor motor. In the stator punching piece of the inner rotor, a plurality of stator teeth are provided on the inner circumference of the yoke, and the adjusting groove is provided facing the stator hole. In the stator punching piece of the outer rotor, a plurality of stator teeth are provided on the outer circumference of the yoke, the adjusting groove is provided facing the stator hole, the stator punching piece is provided in the stator hole, and a part of the outer contour of the tooth shoe coincides with an edge of the stator hole.

In an optional embodiment, S1 is less than a half of S2. If S1 is more than a half of S2, the air gap still can be adjusted to reduce the radial force density, but a proportion of the area S1 of the adjusting groove 13 in the first area is too high, resulting in not significance of the adjusting. Therefore, a relationship between S1 and S2 is further defined to obtain better adjusting effect, thereby further reducing the radial force density of the stator punching piece.

In an optional embodiment, in the same stator tooth, a line from one side of the stator tooth to another side thereof forms a line segment with a shortest distance. Among these line segments, the line segment with the shortest distance from a circle center of the rotor hole is a first line segment, an area difference between the area from the first line segment to the outer circumference of the rotor hole and the area of the adjusting groove is S3, that is, the area of the tooth shoe 122 is S3. (S1+S2)/(S1+S2+S3) is not less than 0.5% and not more than 30%. The adjusting groove provided on the tooth shoe is better adjusted. Although the adjusting groove can extend close to the yoke, so as to extend to the tooth body of the stator teeth. However, when the adjusting groove provided in the tooth body cannot effectively weaken the radial force density. At the same time, it may affect the normal operation of the stator punching piece. Therefore, the adjusting groove is generally located on the tooth shoe, but it does not exclude that a part of the adjusting groove extends to the tooth body 121. In one embodiment, the adjusting groove is completely located in the tooth shoe, the ratio of the area is (S1+S2)/(S1+S2+S3), and the (S1+S2+S3) value for the same type of the stator punching piece is certain. (S1+S2)/(S1+S2+S3) mainly indicates the relative size of the area of the adjusting groove 13.

In one embodiment, (S1+S2)/(S1+S2+S3) is not less than 2% and not more than 15%. After many experiments of the motor, it is found that when (S1+S2)/(S1+S2+S3) is not less than 2% and not more than 15%, the adjusting groove 13 can be better adjusted. At the same time, after further experiments, a smaller area ratio can be obtained, which is an area ratio with the best adjusting effect. However, for motors of different models and specifications, the optimal area ratio of (S1+S2)/(S1+S2+S3) also changes accordingly.

In one embodiment, a bottom of the adjusting groove is concave towards a direction away from the stator hole to form a first arc, a second arc, a third arc and a fourth arc; the third arc is located between the first arc and the second arc, and the fourth arc is located in a middle of the third arc. That is, the adjusting groove of the stator punching piece of the outer rotor is concave towards to the yoke. For the convenience of processing, in an optional embodiment, the adjusting groove 13 is made up of a plurality of arcs. In this way, the specific stator punching piece can be processed by numerical control and presetting the mutual position relationship of a radius and a circle center of each arc. In addition, the bottom of the adjusting groove refers to a side of the adjusting groove away from the stator hole. In different requirements, the adjusting groove of the stator punching piece can also have many other different forms. In one embodiment, the fourth arc may be replaced by a part of a rectangular line or a part of a triangular line. In another embodiment, the bottom of the adjusting groove is composed of regular straight lines. In another embodiment, a bottom curve of the adjusting groove can also be a spline curve. In any event, the method of processing with arc is only an exemplary processing method. The shape of the bottom edge of the adjusting groove is not specifically limited, but it only needs to adjust the relationship between the area of the adjusting groove in the first area and the area of that in the second area to meet the above requirements.

In one embodiment, the circle center of the second arc is located in the first area, the circle center of the first arc is located in the second area, the intersection point of the first arc and the second arc is located in the second area, the circle center of the third arc is located on the centerline, the circle center of the fourth arc is located in the second area, and the two intersection points of the fourth arc and the third arc are located in the second area.

In one embodiment, the radius of the third arc is R3 and the radius of the fourth arc is R4, where R3>R4>0. The radius of the first arc and the second arc are R1 and R2, respectively, and the sizes of R1 and R2 are not further limited here. Further, the fourth arc is formed by a circle whose center is on the centerline rotating angle α in the opposite rotation direction. This setting is to take a variety of different parameters and conduct simulation respectively, so as to obtain the best shape and an area ratio of the adjusting groove. In order to make the fourth arc have two intersections points with the third arc and be located in the middle of the third arc. The radius R4 of the fourth arc is less than the radius R3 of the third arc. In an optional embodiment, after setting the first arc, the second arc and the third arc, the proportional relationship of S1, S2 and S3 is still within the above adjusting range. That is, there is no need to provide the fourth arc at this time. By controlling the circle of each arc, such as the radius and the coordinates of the circle center, the area ratio of each of the adjusting groove is controlled. In addition, the fourth arc is obtained by the circle whose center is on the centerline rotating a certain angle in the opposite rotation direction. When the shape and area of the adjusting groove need to be accurately adjusted, the radius and center position of the first arc, the second arc and the third arc can be kept unchanged, and different rotation angles and different fourth arc radius R4 can be adopted.

Figure 6:
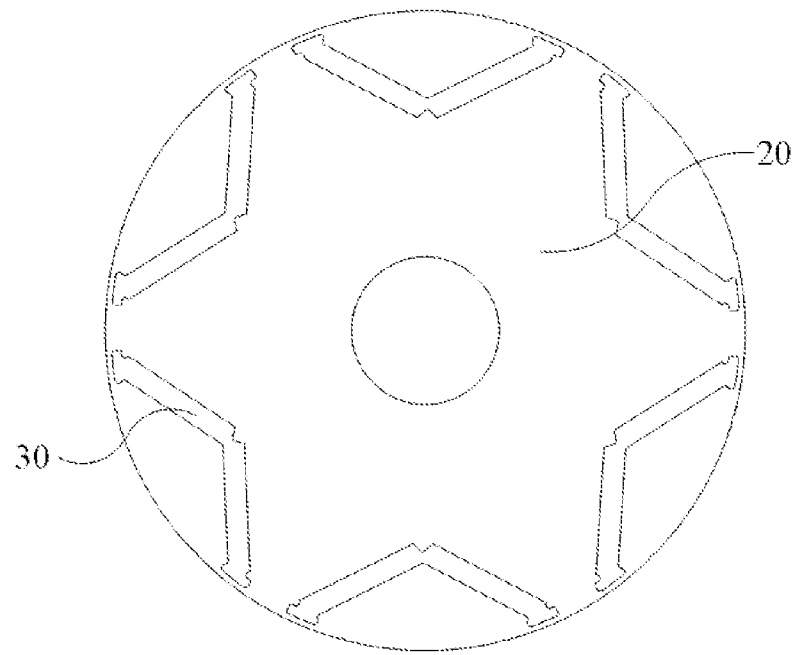
FIG. 6 is a structural diagram of an embodiment of a rotor core of the present application.
Figure 7:
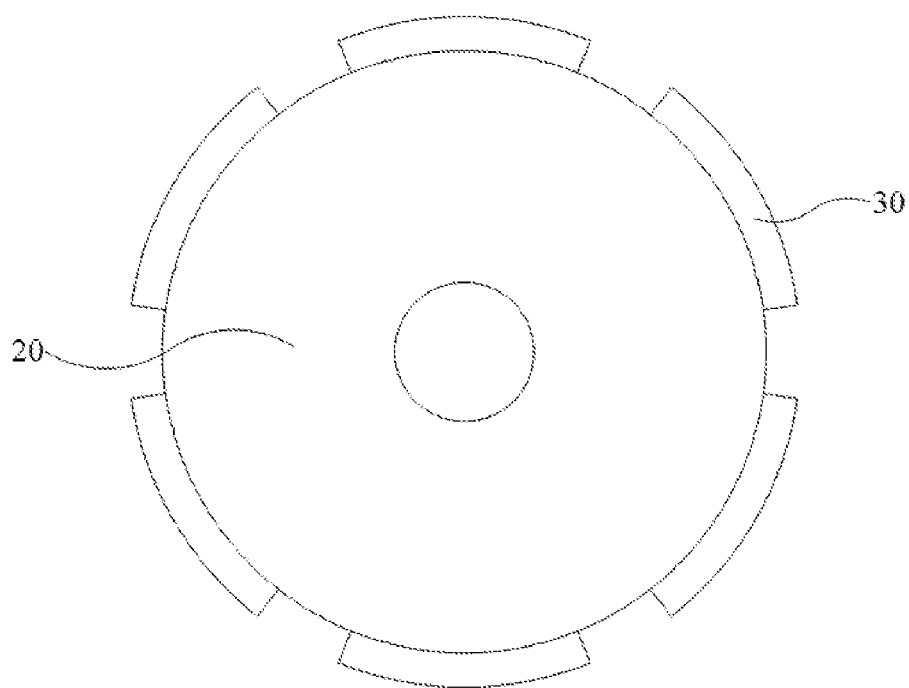
FIG. 7 is a structural diagram of another embodiment of the rotor core of the present application.

Referring to FIGS. 1, 6 and 7, the present application also proposes a motor 100, and the motor 100 includes the stator punching piece above. Further, the motor 100 also includes a rotor core 20 and a permanent magnet 30. In the stator punching piece of the outer rotor, the rotor core 20 and the permanent magnet 30 are provided in the rotor hole. The rotor core 20 is also provided with a rotating shaft hole for the rotating shaft to pass through. In the stator punching piece of the inner rotor, the rotor core 20 is provided with a stator hole, and the stator punching piece is located in the stator hole. In one embodiment, the rotor core 20 is provided by laminating silicon steel pieces. The rotor core 20 is provided with a permanent magnet 30 groove for installing the permanent magnet 30, and the permanent magnet 30 is provided in the permanent magnet 30 groove along the circumferential direction. In one embodiment, the permanent magnet 30 groove is provided on a surface of the rotor core 20, that is, the permanent magnet 30 of surface attachment. In another embodiment, the permanent magnet 30 is provided inside the rotor core 20; that is, the permanent magnet 30 is a built-in permanent magnet. In one embodiment, the permanent magnet 30 is ferrite, neodymium iron boron or a material formed by a combination of the permanent magnet 30 and ferrite. In one embodiment, the number of phases of the motor 100 is 3, whose pole groove matching includes fractional groove and integer groove. The winding can be distributed winding or centralized winding. That is, restrictions on other parameters of the motor 100 can be reduced. In addition to the possible conditions of the motor 100 proposed above, the stator punching piece proposed in the present application can also be used for the motor 100 of other specifications and models in the process of unidirectional rotation.

The present application also proposes a compressor comprising the motor proposed above. The motor in the compressor is generally unidirectional rotation. For the compressor proposed in the present application, the stator punching piece adopted by the motor is an asymmetric structure, which is specially designed and optimized for the service environment of unidirectional rotation, which can effectively reduce the noise of the compressor and improve the service efficiency of the compressor.

The present application also provides a household appliance, which comprises a compressor. With the development of social productivity and people's pursuit of high-quality life, higher requirements for the power and noise of household appliances and so on are put forward. The household appliances proposed in the present application have low noise and high efficiency. Further, household appliances include air conditioners, refrigerators, etc.

The above is only an optional embodiment of the present application and does not limit the scope of the patent of the present application. Any equivalent structural transformation made by the contents of the description and drawings of the present application under the inventive concept of the present application, or directly/indirectly applied in other relevant technical fields, are included in the scope of patent protection of the present application.

The invention claimed is:

1. A stator punching piece with a rotor hole, comprising:
a yoke provided on an outer circumference of the stator punching piece; and
a plurality of stator teeth provided at intervals along an inner circumference of the yoke;
wherein:
each stator tooth comprises a tooth body and a tooth shoe;
one end of the tooth body is connected with the yoke, and another end of the tooth body is connected with the tooth shoe;
one side of the tooth shoe facing the rotor hole is provided with an adjusting groove;
a centerline of the tooth body divides the stator teeth into a first area and a second area;
the first area is located at an upstream side of a rotation direction of a rotor, and the second area is located at a downstream side of the rotation direction of the rotor;
an area of the adjusting groove in the first area is S1, an area the adjusting groove in the second area is S2, and S1 is less than S2;
a bottom of the adjusting groove is concave towards a direction away from the rotor hole to form a first arc, a second arc, a third arc and a fourth arc;
the third arc is provided between the first arc and the second arc, and the fourth arc is provided in a middle of the third arc; and
the second arc, third arc, and fourth arc are provided only in the second area.

2. The stator punching piece according to claim 1, wherein S1 is less than a half of S2.

3. The stator punching piece according to claim 2, wherein:
a line from one side of each stator tooth to another side of the stator tooth forms a line segment with a shortest distance,
the line segment with the shortest distance from a center of the rotor hole is a first line segment, and
an area difference between an area formed between the first line segment and an outer circumference of the rotor hole and an area of the adjusting groove is S3, and (S1+S2)/(S1+S2+S3) is not less than 0.5% and not more than 30%.

4. The stator punching piece according to claim 3, wherein (S1+S2)/(S1+S2+S3) is not less than 2% and not more than 15%.

5. The stator punching piece according to claim 4, wherein:
a bottom of the adjusting groove is concave towards a direction away from the rotor hole to form a first arc, a second arc, a third arc and a fourth arc; and
the third arc is provided between the first arc and the second arc, and the fourth arc is provided in a middle of the third arc.

6. The stator punching piece according to claim 5, wherein:
a circle center of the first arc is located in the second area, a circle center of the second arc is located in the first area, an intersection point of an extension line of the first arc and an extension line of the second arc is located in the second area;
a circle center of the third arc is located on the centerline, and a circle center of the fourth arc is located in the second area; and
two intersection points of the fourth arc and the third arc are located in the second area.

7. The stator punching piece according to claim 6, wherein a radius of the third arc is R3 and a radius of the fourth arc is R4, R3 is greater than R4 and R4 is greater than 0.

8. The stator punching piece according to claim 2, wherein:
a bottom of the adjusting groove is concave towards a direction away from the rotor hole to form a first arc, a second arc, a third arc and a fourth arc; and
the third arc is provided between the first arc and the second arc, and the fourth arc is provided in a middle of the third arc.

9. The stator punching piece according to claim 8, wherein:

a circle center of the first arc is located in the second area, a circle center of the second arc is located in the first area, an intersection point of an extension line of the first arc and an extension line of the second arc is located in the second area;

a circle center of the third arc is located on the centerline, and a circle center of the fourth arc is located in the second area; and two intersection points of the fourth arc and the third arc are located in the second area.

10. The stator punching piece according to claim 9, wherein a radius of the third arc is R3 and a radius of the fourth arc is R4, R3 is greater than R4 and R4 is greater than 0.

11. The stator punching piece according to claim 3, wherein:
a bottom of the adjusting groove is concave towards a direction away from the rotor hole to form a first arc, a second arc, a third arc and a fourth arc; and
the third arc is provided between the first arc and the second arc, and the fourth arc is provided in a middle of the third arc.

12. The stator punching piece according to claim 11, wherein:
a circle center of the first arc is located in the second area, a circle center of the second arc is located in the first area, an intersection point of an extension line of the first arc and an extension line of the second arc is located in the second area;
a circle center of the third arc is located on the centerline, and a circle center of the fourth arc is located in the second area; and
two intersection points of the fourth arc and the third arc are located in the second area.

13. The stator punching piece according to claim 12, wherein a radius of the third arc is R3 and a radius of the fourth arc is R4, R3 is greater than R4 and R4 is greater than 0.

14. The stator punching piece according to claim 1, wherein:
a circle center of the first arc is located in the second area, a circle center of the second arc is located in the first area, an intersection point of an extension line of the first arc and an extension line of the second arc is located in the second area;
a circle center of the third arc is located on the centerline, and a circle center of the fourth arc is located in the second area; and
two intersection points of the fourth arc and the third arc are located in the second area.

15. The stator punching piece according to claim 14, wherein a radius of the third arc is R3 and a radius of the fourth arc is R4, R3 is greater than R4 and R4 is greater than 0.

16. A motor comprising the stator punching piece according to claim 1.

17. A compressor comprising the motor according to claim 16.

18. A household appliance comprising the compressor according to claim 17.

19. A stator punching piece comprising:
a yoke provided on an inner circumference of the stator punching piece; and
a plurality of stator teeth provided at intervals along an outer circumference of the yoke;
wherein:
each stator tooth comprises a tooth body and a tooth shoe;
one end of the tooth body is connected with the yoke, and another end of the tooth body is connected with the tooth shoe;
an outer circumference of the tooth shoe is provided with an adjusting groove;
a centerline of the tooth body divides the stator teeth into a first area and a second area;
the first area is located at an upstream side of a rotation direction of a rotor, and the second area is located at a downstream side of the rotation direction of the rotor;
an area of the adjusting groove in the first area is S1 and an area of the adjusting groove in the second area is S2, and S1 is less than S2;
a bottom of the adjusting groove is concave towards a direction away from the yoke to form a first arc, a second arc, a third arc and a fourth arc;
the third arc is provided between the first arc and the second arc, and the fourth arc is provided in a middle of the third arc; and
the second arc, third arc, and fourth arc are provided only in the second area.

* * * * *